(12) United States Patent
Lu et al.

(10) Patent No.: US 11,307,439 B2
(45) Date of Patent: Apr. 19, 2022

(54) DISPLAY PANEL AND DISPLAY DEVICE

(71) Applicant: Shanghai Tianma Micro-Electronics Co.,Ltd., Shanghai (CN)

(72) Inventors: Feng Lu, Shanghai (CN); Qijun Yao, Shanghai (CN); Yang Zeng, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 281 days.

(21) Appl. No.: 16/670,648

(22) Filed: Oct. 31, 2019

(65) Prior Publication Data

US 2020/0379277 A1 Dec. 3, 2020

(30) Foreign Application Priority Data

May 31, 2019 (CN) .......................... 201910470751.2

(51) Int. Cl.
*G02F 1/13363* (2006.01)
*G02F 1/01* (2006.01)
(Continued)

(52) U.S. Cl.
CPC .......... *G02F 1/0147* (2013.01); *G02F 1/0121* (2013.01); *G02F 1/1368* (2013.01);
(Continued)

(58) Field of Classification Search
CPC .. G02F 1/0147; G02F 1/0121; G02F 1/13363; G02F 1/136286; G02F 1/1368; G02F 1/133638; G02F 1/133365; G02F 1/13725; G02F 2201/44; G02F 2203/02; G02F 2203/34; G09G 3/34; G09G 3/30; G09G 3/3406; G09G 3/3413;
(Continued)

(56) References Cited

U.S. PATENT DOCUMENTS

2013/0176318 A1* 7/2013 Dunn ...................... G09G 3/36
345/501
2016/0299373 A1* 10/2016 Cheng ................... G02F 1/1337
(Continued)

FOREIGN PATENT DOCUMENTS

CN         104216166 A    12/2014
CN         107632445 A     1/2018

*Primary Examiner* — William Boddie
*Assistant Examiner* — Jeffrey Parker
(74) *Attorney, Agent, or Firm* — Anova Law Group, PLLC

(57) ABSTRACT

Display panel and display device are provided. The display panel includes a first substrate, a second substrate, and a plurality of pixel units. Each pixel unit includes a heating element, a reflective layer, a resonant cavity, and a phase-change material layer sequentially disposed on the first substrate, and a liquid crystal cell. The display panel also includes first signal lines extending along a row direction, second signal lines extending along the column direction, and a driving circuit in correspondence to each pixel unit. The driving circuit includes a first driving module and a second driving module that are connected to a same first signal line and a same second signal line. The first driving module drives the heating element to control the state of the phase-change material layer, and the second driving module controls the deflection of liquid crystal molecules in the liquid crystal cell.

20 Claims, 12 Drawing Sheets

(51) Int. Cl.
*G02F 1/1362* (2006.01)
*G02F 1/1368* (2006.01)
*G02F 1/1333* (2006.01)
*G02F 1/137* (2006.01)

(52) U.S. Cl.
CPC .... *G02F 1/13363* (2013.01); *G02F 1/136286* (2013.01); *G02F 1/13725* (2013.01); *G02F 1/133365* (2013.01); *G02F 1/133638* (2021.01); *G02F 2201/44* (2013.01); *G02F 2203/02* (2013.01); *G02F 2203/34* (2013.01)

(58) Field of Classification Search
CPC ...... G09G 3/3433; G09G 3/36; G09G 3/3603; G09G 3/3607; G09G 3/3651; G09G 3/3662
See application file for complete search history.

(56) References Cited

U.S. PATENT DOCUMENTS

2018/0143363 A1* 5/2018 Ichihashi .......... G02F 1/133528
2019/0049788 A1* 2/2019 Kuznetsov ........ G02F 1/133509

* cited by examiner

DISPLAY PANEL AND DISPLAY DEVICE

CROSS-REFERENCES TO RELATED APPLICATIONS

This application claims the priority of Chinese patent application No. 201910470751.2, filed on May 31, 2019, the entirety of which is incorporated herein by reference.

FIELD OF THE DISCLOSURE

The present disclosure generally relates to the field of display technology and, more particularly, relates to a display panel and a display device.

BACKGROUND

The existing display products include liquid crystal display (LCD), organic light emitting display (OLED), inorganic light emitting display (inorganic LED), electronic paper, etc. Moreover, the existing display products also include solid-state reflective display, which does not require backlight illumination, and thus is able to reduce the thickness of the display panel. The solid-state reflective display utilizes a phase-change material, and is able to adjust the refractive index and/or the absorption performance of the phase-change material by controlling the phase-change material to switch between a crystalline state and an amorphous state. The solid-state reflective display device itself does not require a light source to be provided; however, by using ambient light as a light source, the display device is able to realize the display function through the reflection of ambient light. Moreover, the adjustment of the reflection rate of ambient light is implemented by adjusting the refractive index and/or the absorption performance of the phase-change material. Furthermore, after the phase-change material completes the phase change, it is not necessary to continuously apply a power to maintain the present state of the device, which is an advantage that attracts majority manufacturers.

The disclosed display panel and display device are directed to solve one or more problems set forth above and other problems in the art.

BRIEF SUMMARY OF THE DISCLOSURE

One aspect of the present disclosure provides a display panel. The display panel includes a first substrate, a second substrate, and a plurality of pixel units disposed between the first substrate and the second substrate. Each pixel unit of the plurality of pixel units includes a heating element, a reflective layer, a resonant cavity, and a phase-change material layer sequentially disposed on the first substrate, and each pixel unit of the plurality of pixel units further includes a liquid crystal cell disposed on a side of the second substrate that is adjacent to the first substrate. The display panel also includes a plurality of first signal lines extending along a row direction and spaced from each other along a column direction, and a plurality of second signal lines extending along the column direction and spaced from each other along the row direction. The plurality of first signal lines and the plurality of second signal lines are disposed on the first substrate, and intersect each other to define the plurality of pixel units. The display panel further includes a driving circuit in correspondence to each pixel unit of the plurality of pixel units. The driving circuit is located on the first substrate and includes a first driving module and a second driving module. The first driving module drives the heating element to control a state of the phase-change material layer, and the second driving module controls deflection of a plurality of liquid crystal molecules in the liquid crystal cell. The first driving module and the second driving module are connected to a same first signal line of the plurality of first signal lines and a same second signal line of the plurality of second signal lines.

Another aspect of the present disclosure provides a display device. The display device includes a display panel according to the present disclosure.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
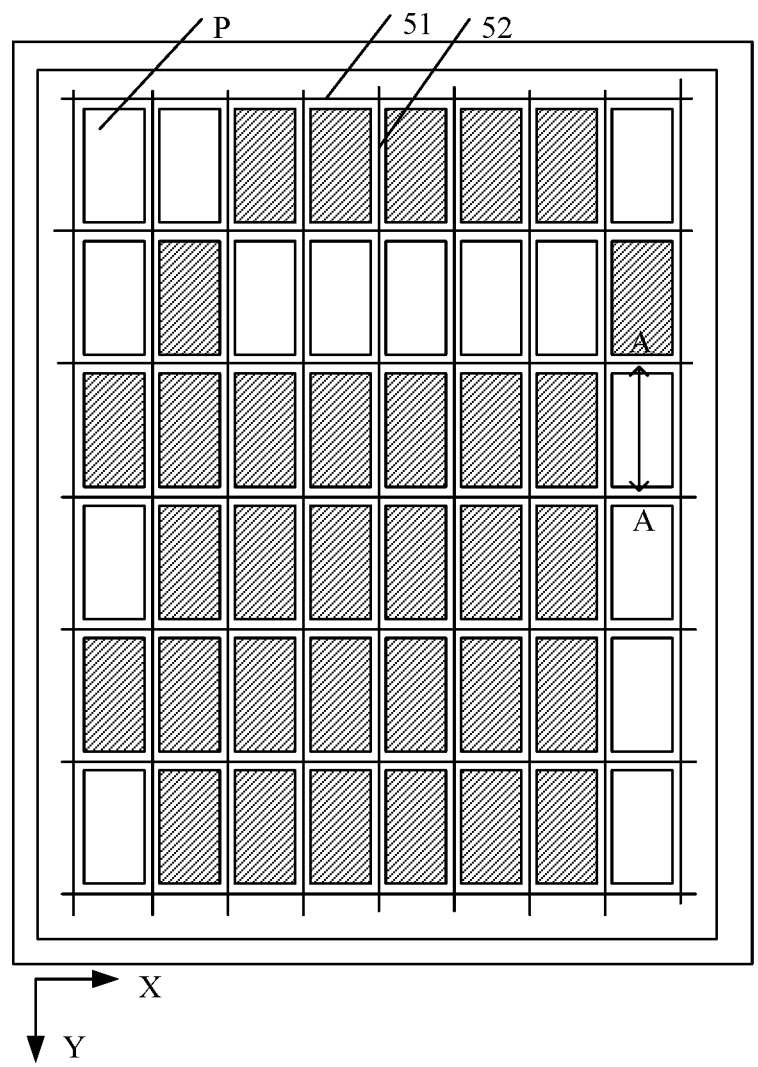
FIG. 1 illustrates a schematic plane-structure view of an exemplary display panel according to various embodiments of the present disclosure.

Various exemplary embodiments of the present disclosure will now be described in detail with reference to the accompanying drawings. It should be noted that the relative arrangement of the components and steps, numerical expressions and numerical values set forth in the embodiments are not intended to limit the scope of the present disclosure. The following description of the at least one exemplary embodiment is merely illustrative, and by no means can be considered as limitations for the application or use of the present disclosure.

It should be noted that techniques, methods, and apparatuses known to those of ordinary skill in the relevant art may not be discussed in detail, but where appropriate, the techniques, methods, and apparatuses should be considered as part of the specification.

In all of the examples shown and discussed herein, any specific values should be considered as illustrative only and not as a limitation. Therefore, other examples of exemplary embodiments may have different values.

It should be noted that similar reference numbers and letters indicate similar items in subsequent figures, and therefore, once an item is defined in a figure, it is not required to be further discussed or defined in the subsequent figures.

In a solid-state reflective display device according to the existing technology, ambient light that is directed to the front side (observer side) of the display panel is generally used as a light source, and a solid-state reflective device (SRD) of the display device includes a heating element, a reflective layer, a resonant cavity, and a phase-change material layer stacked sequentially on each other. The phase-change material can be switched between a crystalline state and an amorphous state. When the heating element is driven to generate heat, the heat is transferred to the phase-change material layer through the reflective layer and the resonant cavity to control the crystallization state of the phase-change material. Further, in cooperation with the thickness of the resonant cavity, a portion of the colors can be reflected to the observer side, while the other portion of the colors may be absorbed. As such, the display color of the display panel can be modulated to realize switching between two colors, that is, realize two-color switching. However, because the display panel can only be switched between two colors, there is no gray scale.

In the existing technology, the phase-change material layer has two states, e.g. a crystalline state and an amorphous state. When the material layer switches between the crystalline state and the amorphous state, the corresponding pixel unit may switch between a first color state and a second color state. For example, when a phase-change material layer is in a crystalline state, and the incident light is white light mixed by red light, green light, and blue light (e.g. red-green-blue-mixed white light), after the white light passes through the phase-change material layer, the blue light is filtered out (e.g. absorbed by the phase-change material layer). Therefore, when the light further passes through the resonant cavity and reaches the reflective layer, the reflected light only contains the green light and the red light. When the reflected green light and red light are transmitted out after passing through the resonant cavity and the phase-change material layer again, the light seen in human eyes is only mixed light of the green light and the red light, which is yellow (the first color state); when the phase-change material layer is in an amorphous state, and the incident light is still red-green-blue-mixed white light, after the white light passes through the phase-change material layer, the green light is filtered out (e.g. absorbed by the phase-change material layer). Therefore, when the light further passes through the resonant cavity and reaches the reflective layer, the reflected light only contains the red light and the blue light. When the reflected red light and blue light are transmitted out after passing through the resonant cavity and the phase-change material layer again, the light seen in human eyes is only mixed light of the red light and the blue light, which is purple (the second color state). Therefore, the corresponding display panel may only have switches between two colors, but not have gray scale. As such, the display of the display panel may not have any change in the brightness because that when the resonant cavity has a certain thickness, and the crystalline state and the amorphous state of the phase-change material layer are defined, the first color state and the second color state of the pixel unit may be determined.

In the existing technology, the gray scale is realized by disposing a liquid crystal cell on the SRD. In addition, the liquid crystal cell requires a driving circuit to drive the liquid crystal molecules in the liquid crystal cell to deflect (i.e. to change the orientation). Therefore, adding a liquid crystal cell leads to an increase in the overall thickness of the display panel.

The present disclosure provides a display panel and a display device to effectively adjust the gray scale of the sub-pixels, thereby improving the display quality of the display panel.

Figure 2:
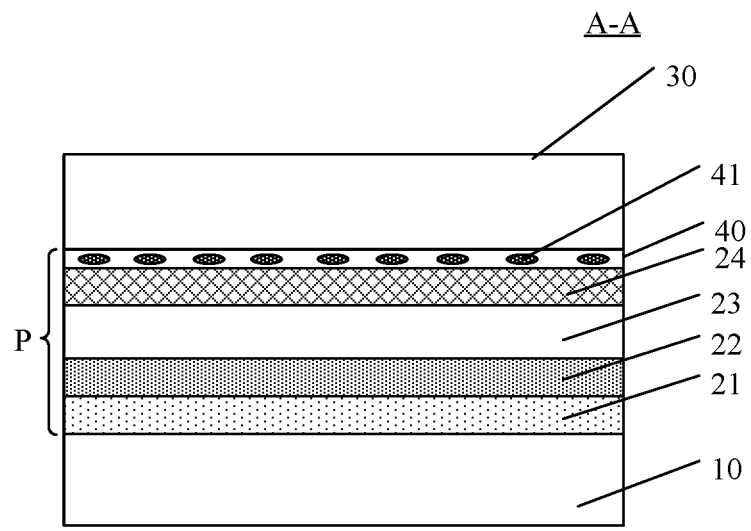
FIG. 2 illustrates a schematic view of an exemplary local cross section of the display panel shown in FIG. 1 along an A-A direction.

FIG. 1 illustrates a schematic plane-structure view of an exemplary display panel according to various embodiments of the present disclosure, and FIG. 2 illustrates a schematic view of an exemplary local cross section of the display panel shown in FIG. 1 along an A-A direction. Referring to FIGS. 1-2, a display panel 100 may include a first substrate 10 and a second substrate 30, and a plurality of pixel units P disposed between the first substrate 10 and the second substrate 30. Each pixel unit P may include a heating element 21, a reflective layer 22, a resonant cavity 23, and a phase-change material layer 24 sequentially disposed on the first substrate 10. Each pixel unit P may also include a liquid crystal cell 40 disposed on a side of the second substrate 30 that is close to the first substrate 20. The liquid crystal cell 40 may include a plurality of liquid crystal molecules 41.

Referring to FIG. 1, the first substrate 10 may further include a plurality of first signal lines 51 extending in the row direction X and spaced from each other along the column direction Y, and a plurality of second signal lines 52 extending in the column direction Y and spaced from each other along the row direction X. The plurality of first signal lines 51 and the plurality of second signal lines 52 may intersect each other to define a plurality of pixel units P. Referring to FIG. 2, each pixel unit P may include a driving circuit (not shown) on the first substrate 10. The driving circuit may include a first driving module and a second driving module. The first driving module may drive the heating element 21, and the heating element 21 may be able to control the state of the phase-change material layer 24. The second driving module may control the liquid crystal molecules 41 in the liquid crystal cell 40 to deflect (i.e. to change the orientation). The first driving module and the second driving module may be connected to a same first signal line or to a same second signal line.

It should be understood that the display panel may further include a plurality of pixel electrodes and one or more common electrodes, and a voltage difference between a pixel electrode and a common electrode may form an electric field that drives the liquid crystal molecules 41 to deflect (i.e. to change the orientation). Therefore, the deflection of the liquid-crystal molecules 41 may be controlled.

In one embodiment, a pixel unit P may be used as a sub-pixel unit for display. It should be understood that a sub-pixel unit may be the smallest light-emitting unit of the display panel, and the display function may be implemented through collective operation of a plurality of pixel units P.

In one embodiment, a protective layer (not shown) may also be disposed to cover the phase-change material layer 24.

The liquid crystal molecules 41 may be liquid crystal molecules that are commonly used in liquid crystal displays, or may be guest-host liquid crystal molecules or polymer liquid crystal molecules. When a guest-host liquid crystal or a polymer liquid crystal is adopted, it is not necessary to provide any polarizer. Therefore, an additional polarizer bonding process may not be required, which further simplifies the preparation process. On the other hand, the thickness of the display panel may be further reduced.

In one embodiment, an alignment film may be provided on both sides of the liquid crystal cell 40 of the display panel. The alignment film may be a film layer which gives an initial alignment state for the liquid crystal molecules 41. For illustrative purposes, the alignment film is not shown in the figure.

The reflective layer 22 and the resonant cavity 23 according to the present disclosure may be both thermally conducting and the resonant cavity 23 may be capable of transmitting light. The reason to have the reflective layer 22 and the resonant cavity 23 both thermally conducting is the following. The phase-change material is switched between the crystalline state and the amorphous state through heating, and thus when the heating element 21 is driven to generate heat, the heat may be more easily transferred through the reflective layer 22 and the cavity 23 and quickly reach the phase-change material layer 24. The phase-change material layer 24 may be made of a material whose refractive index is reversibly switchable when a heat pulse is applied.

In one embodiment, the resonant cavity 23 may be an optical resonant cavity, including two mirrors arranged in parallel with each other. The refractive indices of the two mirrors may be different, and the light may be reflected back and forth between the two mirrors of the optical resonant cavity that have different refractive indices. The wavelength of the light reflected out from the resonant cavity 23 may be controlled by adjusting the thickness of the optical cavity, such that light with a certain wavelength may be reflected out from the resonant cavity 23. By adjusting the thickness of the resonant cavity 23 to match the phase-change material layer 24, each pixel unit P can thus be displayed in two colors. When the plurality of pixel units P are simultaneously displayed, the display panel may be able to display different colors.

According to various embodiments of the present disclosure, the heating element 21 may be driven to generate heat. When the heating element 21 is driven to generate heat, the heat may be rapidly transferred to the phase-change material layer 24 through the reflective layer 22 and the resonant cavity 23, and thus the phase-change material layer 24 may be heated, such that the phase-change material layer 24 can be controlled to switch from one state to another state. When a liquid crystal cell 40 is disposed on the SRD, after the light enters a pixel unit P, the light may pass through the liquid crystal cell to enter the phase-change material layer 24, and then enter the resonant cavity 23. Further, the light may be reflected out from the resonant cavity 23 and may then be reflected by the reflective layer 22 to enter the resonant cavity 23 again. The light may further enter the phase-change material layer 24 and may then be transmitted out through the liquid crystal cell 40. Through the cooperative action of the reflective layer 22, the resonant cavity 23, the phase-change material layer 24, and the liquid crystal cell 40, the wavelength of the light transmitted out from the liquid crystal cell after reflection may determine the display color of the corresponding pixel unit P.

According to various embodiments of the present disclosure, each pixel unit P of the display panel can be switched between the first color state and the second color state, and the gray scale can also be changed. When white light passes through the liquid crystal cell 40, the phase-change material layer 24, and the resonant cavity 23, and reaches the reflective layer 22, through the cooperative action of the thickness of the resonant cavity 23 and the phase-change material layer 24, the light in one of the colors may be filtered out, and the remaining light may be reflected as mixed light. The reflected mixed light may pass through the resonant cavity 23 and the phase-change material layer 24 once again and enter the liquid crystal cell 40. Further, the reflected mixed light may be transmitted out through the liquid crystal cell 40. Since the reflected mixed light passes through the liquid crystal cell 40 again, the transmittance of the mixed light may be controlled by controlling the deflection of the liquid crystal molecules 41 in the liquid crystal cell 40, such that adjustment of the gray scale may be realized.

For example, in a pixel unit P, when the phase-change material layer 24 is in the crystalline state and the incident light is white light containing light in three colors, e.g. red, green, and blue, after the white light passes through the liquid crystal cell 40 and the phase-change material layer 24, the blue light may be filtered out. Therefore, when the light further passes through and the resonant cavity 23 and reaches the reflective layer 22, the reflected light may only contain the green light and the red light. The reflected green light and red light may pass through the resonant cavity 23 and the phase-change material layer 24 once again and enter the liquid crystal cell 40. Further, the reflected green light and red light may be transmitted out through the liquid crystal cell 40. Accordingly, the light viewed by human eyes may be mixed light containing only green light and red light, and thus the color of the light may be yellow (the first color state). Because the reflected green light and red light passes through the liquid crystal cell 40 one more time, the transmittance of the mixed light (green light and red light) may be adjusted by controlling the deflection of the liquid crystal molecules 41 in the liquid crystal cell 40, and as such, adjustment of the gray scale can be realized. When the phase-change material layer 24 is in the amorphous state and the incident light is white light containing light in three colors, e.g. red, green, and blue, after the white light passes through the liquid crystal cell 40 and the phase-change material layer 24, the green light may be filtered out. Therefore, when the light further passes through the resonant cavity 23 and reaches the reflective layer 22, the reflected light may only contain the red light and the blue light. The reflected red light and blue light may pass through the resonant cavity 23 and the phase-change material layer 24 once again and enter the liquid crystal cell 40. Further, the reflected red light and blue light may be transmitted out through the liquid crystal cell 40. Accordingly, the light viewed by human eyes may be mixed light containing only red light and blue light, and thus the color of the light may be purple (the second color state). Because the reflected red light and blue light passes through the liquid crystal cell 40 one more time, the transmittance of the mixed light (red light and blue light) may be adjusted by controlling the deflection of the liquid crystal molecules 41 in the liquid crystal cell 40, and as such, adjustment of the gray scale can be realized.

Therefore, the gray scale of the display of the pixel unit P in the display panel according to various embodiments of the present disclosure can be adjusted.

It should be understood that the first driving module may be electrically connected to the heating element 21. The first driving module may drive the heating element 21 such that the heating element 21 can be used for heating. When the heating element 21 is driven to generate heat, the heat may be quickly transferred to the phase-change material layer 24 through the reflective layer 22 and the resonant cavity 23, such that the phase-change material layer 24 may be heated. Therefore, the phase-change material layer 24 may be controlled to switch from one state to another state (e.g. from a crystalline state to an amorphous state, or from an amorphous state to a crystalline state). The second driving module may be electrically connected to each of the plurality of pixel electrodes in the liquid crystal cell 40, and the plurality of pixel electrodes and the common electrode may be located on the two sides of the liquid crystal cell 40, and may provide electric voltages to drive the liquid crystal molecules 41 in the liquid crystal cell 40. The voltage difference formed between each pixel electrode and the common electrode may form an electric field to drive the liquid crystal molecules 41 to deflect (i.e. to change the orientation). The deflection of the liquid crystal molecules 41 may then control the transmittance of the light through the liquid crystal cell 40, thereby adjusting the gray scale of the display panel.

The first driving module and the second driving module may be both disposed on the first substrate. The first driving module and the second driving module sharing the first substrate may be able to reduce the thickness of the display panel.

The first driving module and the second driving module may be connected to a same first signal line 51, and the first driving module and the second driving module may also be connected to a same second signal line 52. That is, the first driving module and the second driving module may share a same first signal line 51 and a same second signal line 52, thereby reducing the number of the wires in the display panel.

It should be understood that various embodiments of the present disclosure use the same first signal line 51 and the same second signal line 52 to provide driving signals to the first driving module and the second driving module in each pixel unit, such that the first driving module may be able to drive the heating element 21 and the heating element 21 may thus control the state of the phase-change material layer, while the second driving module may be able to control the deflection of the liquid crystal molecules 41 in the liquid crystal cell 40.

According to the present disclosure, the display panel may have the following beneficial effects.

In the display panel according to various embodiments of the present disclosure, the heating element 21, the reflective layer 22, the resonant cavity 23, and the phase-change material layer 24 may together serve as an SRD. When a liquid crystal cell 40 is disposed on the SRD, after light enters a pixel unit P, the light may pass through the liquid crystal cell 40 and may be refracted while entering the phase-change material layer 24. Then, the light may enter the resonant cavity 23, and may then be transmitted out from the resonant cavity 23 to reach the reflective layer 22. Further, after being reflected by the reflective layer 22, the light may enter the resonant cavity 23 again. After passing through the resonant cavity 23 and the phase-change material layer 24, the light may be refracted and enter the liquid crystal cell 40. The liquid crystal molecules 41 in the liquid crystal cell 40 may be deflected by the electric field formed between the pixel electrode and the common electrode, and thus control the transmittance of the light passing through the liquid crystal cell 40. As such, the gray scale of the display panel may be adjusted. In the meantime, the SRD and the liquid crystal cell 40 sharing the first substrate 10 may be conducive to reducing the thickness of the display panel 100, and the first driving module and the second driving module sharing a same first signal line 51 and a same second signal line 52 may reduce the number of the wires in the display panel.

In some embodiments, referring to FIG. 2, the liquid crystal molecules 41 in the liquid crystal cell 40 may be guest-host liquid crystal molecules or polymer liquid crystal molecules. It should be noted that when a guest-host liquid crystal or a polymer liquid crystal is adopted, it is not necessary to provide any polarizer. Therefore, an additional polarizer bonding process may not be required, which further simplifies the preparation process. On the other hand, the thickness of the display panel may be further reduced.

When the liquid crystal molecules 41 in the liquid crystal cell 40 are guest-host liquid crystal molecules, the guest-host effect may be achieved. According to the guest-host effect, a dichroic dye that has different absorption of visible light along the long axis direction and the short axis direction is used as a guest to be dissolved in an aligned liquid crystal host, and the dichroic dye may be aligned in the same direction as the liquid crystal molecules 41. When the arrangement of the liquid crystal molecules 41 that serve as the host change under the action of the electric field, the alignment direction of the dichroic dye molecules may also change accordingly. That is, the absorption of the incident light by the dichroic dye may also change. When there is no external electric field applied to the liquid crystal cell 40, the dye may be oriented with the liquid crystal in the =/=direction, and the light vector may be parallel to the long axis of the dye molecules. As such, the dye may strongly absorb the light, which corresponds to a turned-off state. When the incident light is white light and the color of the dye is red, that is, the light transmitted from the dye is red light. When the dye is black, light with any wavelength in the visible wavelength range may be absorbed. When an external electric field is applied to the liquid crystal cell 40, the dye may be turned into a ⊥/⊥ orientation together with the liquid crystal, and the light vector may be perpendicular to the long axis of the dye molecules. As such, the dye may have minimal absorption of the light. At this time, the light may be able to pass through the liquid crystal cell 40, and the liquid crystal cell may be regarded as colorless, which corresponds to a turned-on state.

That is, when the liquid crystal cell 40 does not apply any electric field, the light that passes through the phase-change material layer 24 and enters the liquid crystal cell 40 may be absorbed by the dye, and when an electric field is applied, the dye may not absorb the light, and the light that passes through the phase-change material layer 24 and enters the liquid crystal cell 40 may be able to pass through the liquid crystal cell 40.

In one embodiment, when the liquid crystal molecules are guest-host liquid crystal molecules, the phase-change material layer may be further provided with a quarter-wave plate on a side that is close to the liquid crystal cell.

When a guest-host liquid crystal is adopted, a quarter-wave plate may be disposed on the side of the phase-change material layer that is close to the liquid crystal cell. The quarter-wave plate may be coated on the phase-change material layer through a coating process. The reason for disposing a quarter-wave plate on the phase-change material layer may be the following. In the display panel, a polarizer is required to be attached to the guest-host liquid crystal cell, and because of the absorption of the polarizer, more than 50% of the incident light may be lost, and the liquid crystal cell may become darker; the reflective layer 22 described above may not be able to destroy the polarization of the reflected light, but the reflection angle of the reflective layer 22 may be small, so that the viewing angle of the quest-host liquid crystal cell may be narrowed. When only removing the polarizer, the switching ratio of the absorbance may be significantly reduced. Therefore, in one embodiment, a quarter-wave plate may be used, and two incident polarized light components that are orthogonal to each other may be rotated by 90 degrees in the two paths by the quarter-wave plate, and the polarized light components may be exchanged. Therefore, in the turned-off state when no electric field is applied, each polarized light component is absorbed regardless of the incident light path or the reflected light path.

In one embodiment, the liquid crystal molecules 41 in the liquid crystal cell 40 may be polymer liquid crystal molecules, and the display panel may not need to be provided with any polarizer. Polymer liquid crystal, also known as polymer dispersed liquid crystal (PDLC), is a small droplet of liquid crystal dispersed in an organic solid polymer matrix, because the optical axis of small droplets composed of liquid crystal molecules can be freely oriented, the refractive index thereof may not match the refractive index of the substrate, and when passing through the substrate, light may be strongly scattered by the droplets and may thus be in an opaque opalescent state or a translucent state. By applying an electric field may be able to adjust the optical axis orientation of the liquid crystal droplets, and when the refractive indices of the two are matched, a transparent state may be obtained. After the electric field is removed, the liquid crystal droplets may return to the original dispersive state, and thus display. That is, when the liquid crystal cell 40 is not provided with an electric field, light passing through the phase-change layer may enter the liquid crystal cell 40 and then be scattered, and thus an opalescent state or a translucent state may be presented; when an electric field is applied, the light may be in a transparent state, and light passing through the phase-change material layer 24 and entering the liquid crystal cell 40 may pass through the liquid crystal cell 40 to present a color.

Figure 3:
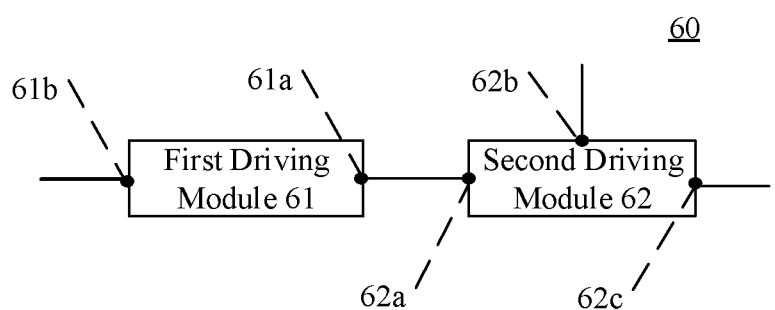
FIG. 3 illustrates a schematic view of an exemplary driving circuit according to various embodiments of the present disclosure.

FIG. 3 illustrates a schematic view of an exemplary driving circuit according to various embodiments of the present disclosure. Referring to FIG. 3, a driving circuit 60 may include a first driving module 61 and a second driving module 62. The first driving module 61 may include a first terminal 61a and a second terminal 61b, and the second driving module 62 may include a control terminal 62a, a second input terminal 62b, and a second output terminal 62c. The control terminal 62a of the second driving module 62 may be connected to the first terminal 61a of the first driving module 61.

It should be understood that the control terminal 62a of the second driving module 62 is connected to the first terminal 61a of the first driving module 61, so that the second driving module 62 and the first driving module 61 may be able to simultaneously receive signals.

Referring to FIGS. 2-3, the first driving module may drive the heating element 21, such that the heating element 21 may be driven to generate heat. When the heating element 21 is driven to generate heat, the heat may be rapidly transferred to the phase-change material layer 24 through the reflective layer 22 and the resonant cavity 23, and thus the phase-change material layer 24 may be heated, such that the phase-change material layer 24 can be controlled to switch from one state to another state. The control terminal 62a of the second driving module 62 may be connected to the first terminal 61a of the first driving module 61, and in the meantime, the control terminal 62a of the second driving module 62 may control the second driving module 62 to be turned on such that data signal may be inputted through the first input terminal 62b and then outputted through the second output terminal 62c. The second output terminal 62c may be electrically connected to the pixel electrode, and the voltage difference between the pixel electrode and the common electrode may form an electric field to drive the liquid crystal molecules 41 to deflect (i.e. to change the orientation). The deflection of the liquid crystal molecules 41 may be able to control the transmittance of the light passing through the liquid crystal cell 40, and thus adjust the gray scale of the display panel.

Figure 4:
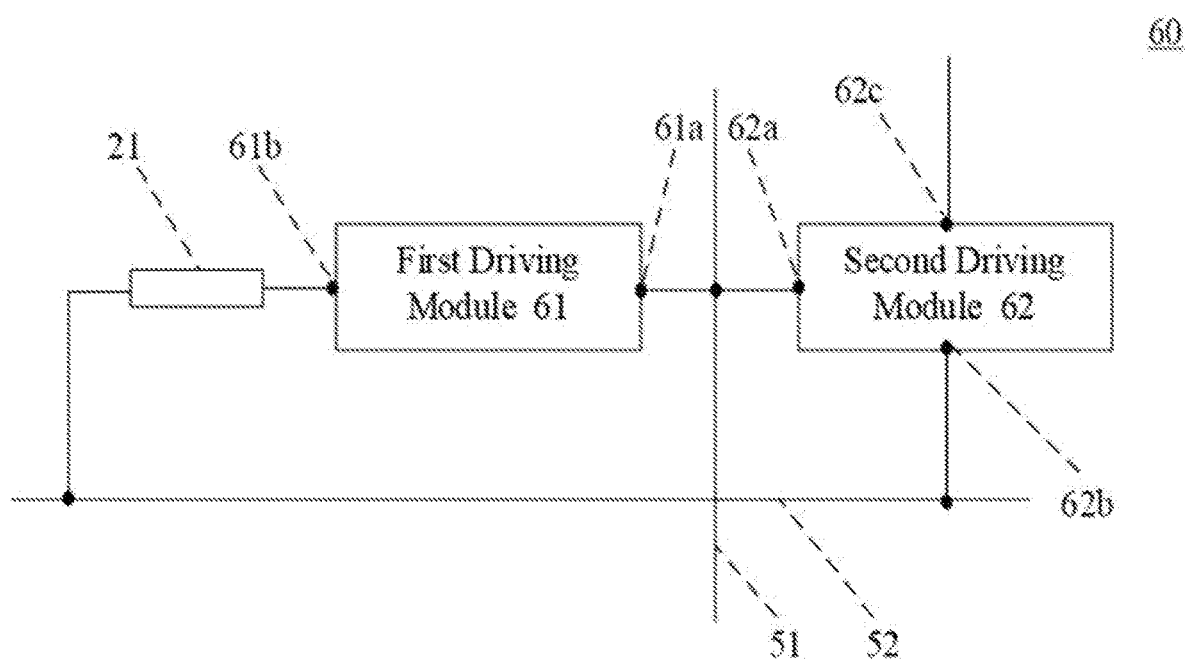
FIG. 4 illustrates a schematic view of another exemplary driving circuit according to various embodiments of the present disclosure.

FIG. 4 illustrates a schematic view of another exemplary driving circuit according to various embodiments of the present disclosure. Referring to FIG. 4, the heating element 21 may have a terminal connected to a second signal line 52 and the other terminal connected to the second terminal 61b of the first driving module 61. The first terminal 61a of the first driving module may be connected to a first signal line 51. The second input terminal 62b of the second driving module 62 may be connected to the second signal line, and the control terminal 62a of the second driving module 62 may be connected to the first signal line 51.

In each pixel unit, the first driving module 61 and the second driving module 62 may share a same first signal line 51 and a same second signal line 52, the first terminal 61a of the first driving module may be connected to the first signal line 51, the second input terminal 62b of the second driving module 62 may be connected to the second signal line 52, and the control terminal 62a of the second driving module 62 may be connected to the first signal line 61. That is, each first signal line 51 and each second signal line 52 may not only provide a driving signal to the first driving module 61, but also provide a driving signal to the second driving module 62. Therefore, the first driving module 61 and the second driving module 62 sharing a same first signal line 51 and a same second signal line 52 may be able to reduce the total number of the wires in the display panel.

Referring to FIG. 2 and FIG. 4, the second terminal 61b of the first driving module 61 may be connected to the heating element 21, the heating element 21 may have one terminal connected to the second signal line 52, and the other terminal connected to the second terminal 61b of the first driving module 61. When the first driving module 61 is turned on to drive the heating element 21, such that the heating element 21 may generate heat. When the heating element 21 is driven to generate heat, the heat may be rapidly transferred to the phase-change material layer 24 through the reflective layer 22 and the resonant cavity 23, and thus the phase-change material layer 24 may be heated, such that the phase-change material layer 24 can be controlled to switch from one state to another state.

The control terminal of the second driving module 62 may be connected to the first terminal 61a of the first driving module 61. The control terminal 62a of the second driving module 62 may control the second driving module 62 to be turned on such that a pixel voltage signal may be inputted through the first input terminal 62b and then be outputted through the second output terminal 62c. The second output terminal 62c may be connected to the pixel electrode, and the common voltage signal of the common electrode may be provided by a driving integrated circuit (IC, not shown) disposed on the first substrate. The voltage difference between the pixel electrode and the common electrode may form an electric field to drive the liquid molecules to deflect (i.e. to change the orientation). As such, the deflection of the liquid crystal molecules may be controlled.

In one embodiment, the electric voltages of the first driving module 61 and the second driving module 62 may be different. Therefore, the first driving module 61 and the second driving module 62 may be simultaneously controlled and turned on in a time-sharing manner by adjusting the voltage signal on the second signal line 52. In the following, the details of turning on the first driving module 61 and the second driving module 62 in a time-sharing manner will be described.

Figure 5:
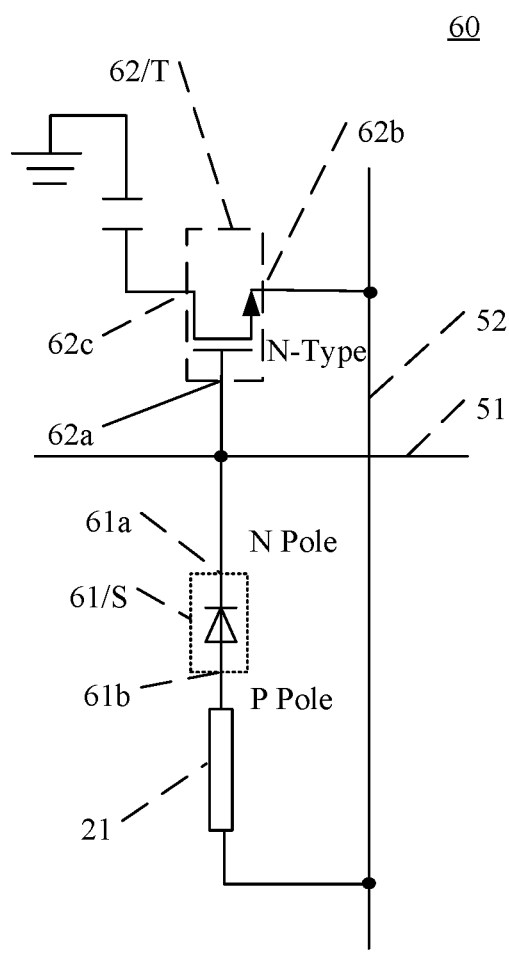
FIG. 5 illustrates a schematic view of another exemplary driving circuit according to various embodiments of the present disclosure.

FIG. 5 illustrates a schematic view of another exemplary driving circuit according to various embodiments of the present disclosure. Referring to FIG. 5, the first driving module 61 may include a diode S, and the two terminals of the diode S may be the first terminal 61a and the second terminal 61b, respectively. The second driving module 62 may include a first transistor T, and the terminals of the first transistor T may include the control terminal 62a, the second input terminal 62b, and the second output terminal 62c.

In one embodiment, the first terminal 61a of the diode S shown in FIG. 5 may be an output terminal, the second terminal 61b of the diode S may be an input terminal. The control terminal 62a of the first transistor T shown in FIG. 5 may be a gate electrode, the second input terminal 62b may be a source electrode or a drain electrode, the second output terminal 62c may be a drain electrode or a source electrode.

The second terminal 61b of the diode S may be connected to the heating element 21, and the heating element 21 may have one terminal connected to the second signal line 52 and the other terminal connected to the second terminal 61b of the diode S. After the diode S is turned on, the heating element 21 may be driven to generate heat. When the heating element 21 is driven to generate heat, the heat may be rapidly transferred to the phase-change material layer 24 through the reflective layer 22 and the resonant cavity 23, and thus the phase-change material layer 24 may be heated, such that the phase-change material layer 24 can be controlled to switch from one state to another state.

The control terminal 62a (gate electrode) of the first transistor T may be electrically connected to the first terminal 61a of the diode S, and the control terminal 62a of the first transistor T may control the first transistor T to be turned on, such that a pixel voltage signal may be inputted through the first input terminal 62b (the source electrode or the drain electrode) and then be outputted through the second output terminal 62c (the drain electrode or the source electrode). The second output terminal 62c (the drain electrode or the source electrode) may be connected to the pixel electrode, and the common voltage signal of the common electrode may be provided by a driving integrated circuit (IC, not shown) disposed on the first substrate. The voltage difference between the pixel electrode and the common electrode may form an electric field to drive the liquid molecules to deflect (i.e. to change the orientation). As such, the deflection of the liquid crystal molecules may be controlled.

When the first transistor T is an N-type first transistor, the first terminal 61a of the diode S may be the N pole of the diode. For example, referring to FIG. 5, the first transistor shown in FIG. 5 may be an N-type first transistor, and the first terminal 61a of the diode S may be the N pole of the diode. It should be understood that when the first transistor T is an N-type first transistor, the gate electrode (the control terminal 62a) of the first transistor T may be connected to the N pole of the diode S.

It should be understood that, on the one hand, driving the SRD may need a diode S for driving because the heating process of the heating element requires a large current. However, the current of the first transistor T may be insufficient to drive the heating element to efficiently generate heat. The first transistor T may be used to drive the liquid crystal cell 40, and the first transistor T may not be able to sustain the large current that drives the diode. When the diode S and the first transistor T are simultaneously turned on, the first transistor T may be damaged. Therefore, the diode S and the first transistor T may need to be turned on in a time-sharing manner. On the other hand, having the diode S and the first transistor T turned on in a time-sharing manner may be able to realize the sharing of the first signal line 51 and the second signal line 52 by the diode S and the first transistor T. Turning on the diode S and the first transistor T in a time-sharing manner may refer to that when the diode S is turned on, the first transistor T is in the turned-off state, and only when the diode S is turned off, the first transistor T may then be turned on. The gate electrode (the control terminal 62a) of the first transistor may be connected to the N pole of the diode S, such that the second diode and the first transistor T can be turned on in a time-sharing manner.

Figure 6:
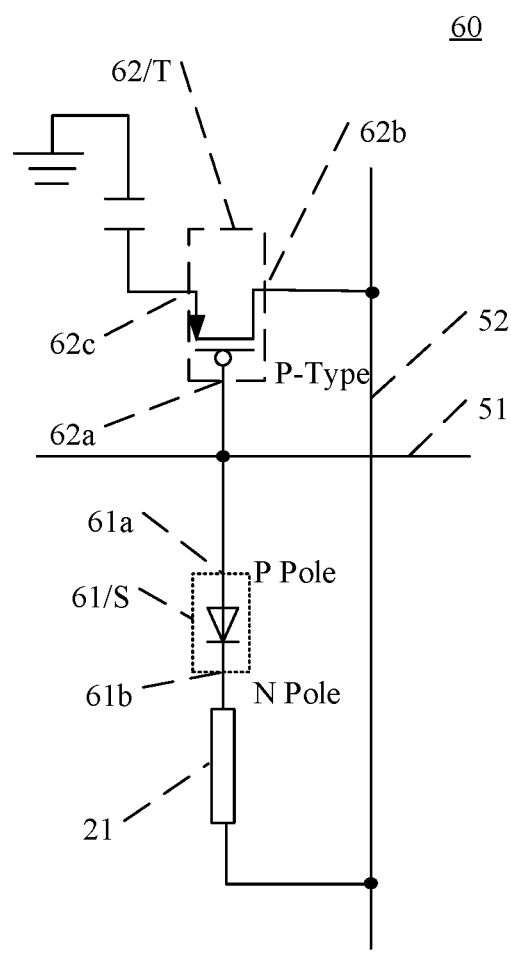
FIG. 6 illustrates a schematic view of another exemplary driving circuit according to various embodiments of the present disclosure.

Similarly, when the first transistor is a P-type first transistor, the first terminal of the diode may be the P pole of the diode S. FIG. 6 illustrates a schematic view of another exemplary driving circuit according to various embodiments of the present disclosure. Referring to FIG. 6, the first transistor may be a P-type first transistor, and the first terminal 61a of the diode S may be the P pole of the diode. It should be understood that when the first transistor T is a P-type first transistor, the gate electrode (the control terminal 62a) of the first transistor T may be connected to the P pole of the diode S.

It should be understood that, on the one hand, driving the SRD may need a diode S for driving because the heating process of the heating element requires a large current. However, the current of the first transistor T may be insufficient to drive the heating element to efficiently generate heat. The first transistor T may be used to drive the liquid crystal cell 40, and the first transistor T may not be able to sustain the large current that drives the diode. When the diode S and the first transistor T are simultaneously turned on, the first transistor T may be damaged. Therefore, the diode S and the first transistor T may need to be turned on in a time-sharing manner. On the other hand, having the diode S and the first transistor T turned on in a time-sharing manner may be able to realize the sharing of the first signal line 51 and the second signal line 52 by the diode S and the first transistor T. Turning on the diode S and the first transistor T in a time-sharing manner may refer to that when the diode S is turned on, the first transistor T is in the turned-off state, and only when the diode S is turned off, the first transistor T may then be turned on. When the first transistor T is a P-type first transistor, the gate electrode (the control terminal 62a) of the first transistor may be connected to the P pole of the diode S, such that the second diode and the first transistor T can be turned on in a time-sharing manner.

The details of the principle for turning on the diode S and the first transistor T in a time-sharing manner will be described in a section below.

Figure 7:
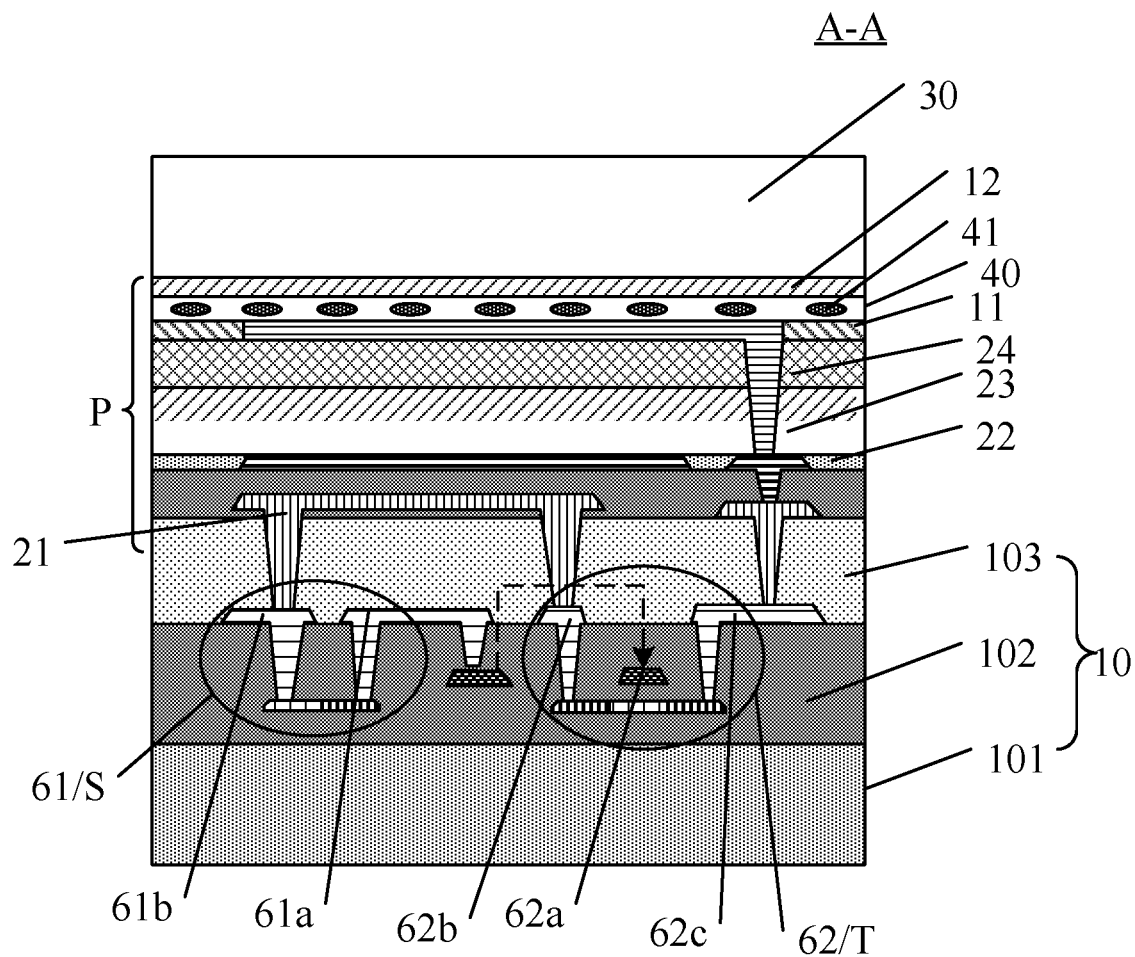
FIG. 7 illustrates a schematic view of another exemplary local cross section of the display panel shown in FIG. 1 along the A-A direction.

FIG. 7 illustrates a schematic view of another exemplary local cross section of the display panel shown in FIG. 1 along the A-A direction. Referring to FIG. 7, each pixel unit P may include a pixel electrode 11 and a common electrode 12. The common electrode 12 may be located on the side of the liquid crystal cell 40 that is away from the first substrate 10. The pixel electrode 11 may be located on the side of the liquid crystal cell 40 that is adjacent to the first substrate 10. The pixel electrode 11 may be connected to a first voltage signal, and the common electrode 12 may be connected to a common voltage signal. The voltage difference between the first voltage of the pixel electrode 11 and the common voltage of the common electrode 12 may form an electric field that drives the deflection of the liquid crystal molecules 41. Therefore, by controlling the deflection of the liquid crystal molecules 41 in the liquid crystal cell 40, white light passing through the liquid crystal cell 40, the phase-change material layer 24, and the resonant cavity 23, and reaching the reflective layer 22 may have one color filtered out due the cooperative action of the thickness of the resonant cavity 23 and the phase-change material layer 24. The remaining light may be reflected as mixed light. The reflected mixed light may pass through the resonant cavity 23 and the phase-change material layer 24 once again and enter the liquid crystal cell 40. Further, the reflected mixed light may be transmitted out through the liquid crystal cell 40. Since the reflected mixed light passes through the liquid crystal cell 40 again, the transmittance of the mixed light may be controlled by controlling the deflection of the liquid crystal molecules 41 in the liquid crystal cell 40, such that adjustment of the gray scale may be realized.

Further, referring to FIG. 7, the first driving module 61 in FIG. 7 may include a first terminal 61a and a second terminal 61b, and the second driving module 62 may include a control terminal 62a, a second input terminal 62b, and a second output terminal 62c. The control terminal 62a of the second driving module 62 may be connected to the first terminal 61a of the first driving module 61. The dotted arrow in FIG. 7 indicates that the control terminal 62a of the second driving module 62 is connected to the first terminal 61a of the first driving module 61. It should be understood that in FIG. 7, the first substrate 10 may include a base substrate 101, an inorganic insulating layer 102, and an organic insulating layer 103. In one embodiment, the inorganic insulating layer 102 may include a plurality of interlayer insulating layers, which are not shown in the FIG. 7. The number of the interlayer insulating layers included in the inorganic insulating layer 102 is not specifically defined in the embodiments of the present disclosure. The first driving module 61 may be electrically connected to the heating element 21, such that the first driving module 61 may drive the heating element 21 to generate heat. When the heating element 21 is driven to generate heat, the heat may be rapidly transferred to the phase-change material layer 24 through the reflective layer 22 and the resonant cavity 23, and thus the phase-change material layer 24 may be heated, such that the phase-change material layer 24 can be controlled to switch from one state to another state.

The second driving module 62 may be electrically connected to the pixel electrode 11 in the liquid crystal cell 40, the common voltage signal of the common electrode 12 may be provided by a driving IC (not shown) disposed on the first substrate 10. The voltage difference between the first voltage of the pixel electrode 11 and the common voltage of the common electrode 12 may form an electric field that drives the deflection of the liquid crystal molecules 41.

Therefore, the deflection of the liquid crystal molecules 41 in the liquid crystal cell 40 may be controlled. Because the mixed light reflected from the reflective layer 22 passes through the liquid crystal cell 40 again, the transmittance of the mixed light may be controlled by controlling the deflection of the liquid crystal molecules 41 in the liquid crystal cell 40, such that adjustment of the gray scale may be realized.

Figure 8:
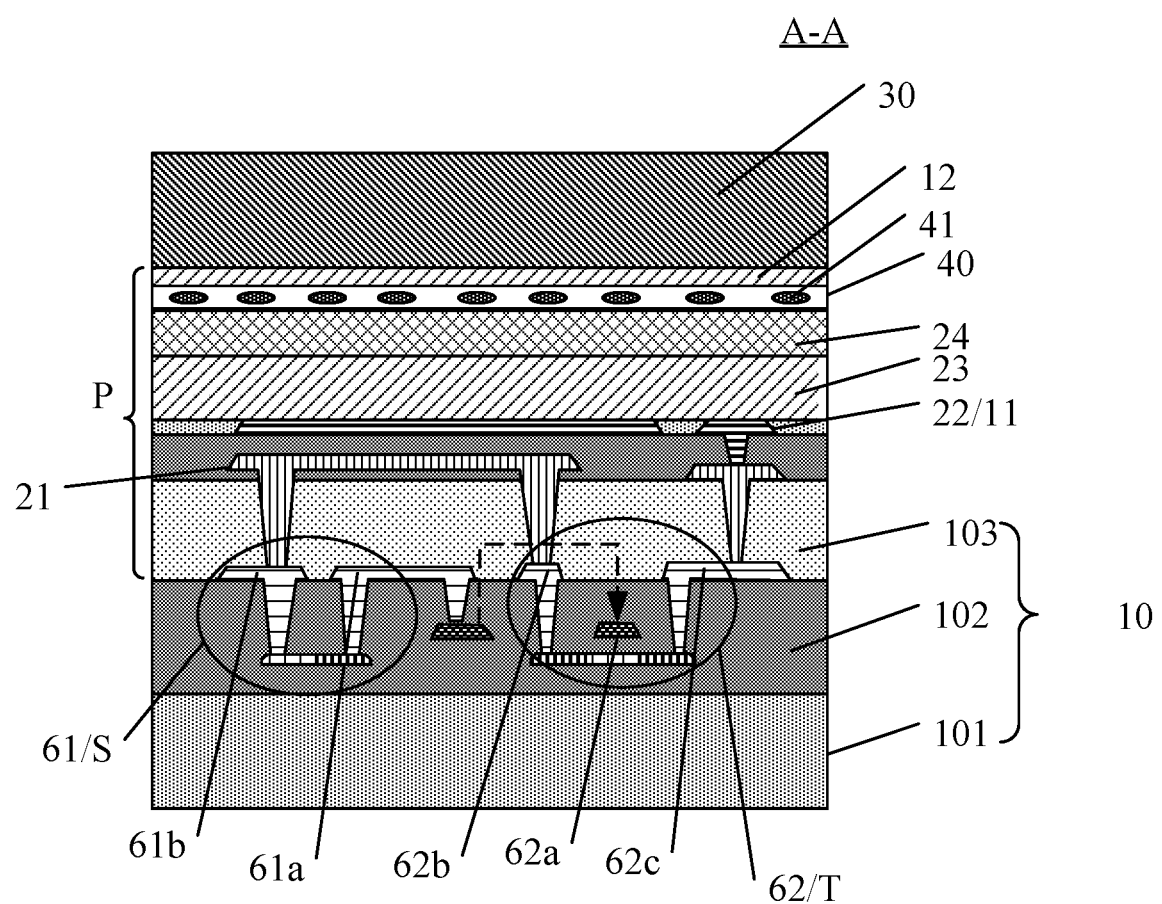
FIG. 8 illustrates a schematic view of another exemplary local cross section of the display panel shown in FIG. 1 along the A-A direction.

FIG. 8 illustrates a schematic view of another exemplary local cross section of the display panel shown in FIG. 1 along the A-A direction. Referring to FIG. 8, the reflective layer 22 may be connected to a first voltage signal, and the reflective layer 22 may be multiplexed as a pixel electrode 11.

The first driving module 61 in FIG. 8 may include a first terminal 61a and a second terminal 61b, and the second driving module 62 may include a control terminal 62a, a second input terminal 62b, and a second output terminal 62c. The control terminal 62a of the second driving module 62 may be connected to the first terminal 61a of the first driving module 61. The dotted arrow in FIG. 8 indicates that the control terminal 62a of the second driving module 62 is connected to the first terminal 61a of the first driving module 61. It should be understood that in FIG. 8, the first substrate 10 may include a base substrate 101, an inorganic insulating layer 102, and an organic insulating layer 103. In one embodiment, the inorganic insulating layer 102 may include a plurality of interlayer insulating layers, which are not shown in the FIG. 8. The first driving module 61 may be electrically connected to the heating element 21, such that the first driving module 61 may drive the heating element 21 to generate heat. When the heating element 21 is driven to generate heat, the heat may be rapidly transferred to the phase-change material layer 24 through the reflective layer 22 and the resonant cavity 23, and thus the phase-change material layer 24 may be heated, such that the phase-change material layer 24 can be controlled to switch from one state to another state.

The pixel unit P may include a pixel electrode 11 (multiplexed from the reflective layer 22) and a common electrode 12. In one embodiment, the reflective layer 22 may be electrically connected to the second driving module via a through hole. When the second driving module 62 is turned on, the reflective layer 22 may be connected to a pixel voltage. That is, the reflective layer 22 may not only serve as a reflective layer of the SRD, but also serve as the pixel electrode 11 of the liquid crystal cell 40.

When the reflective layer 22 is not multiplexed as a pixel electrode 11, the reflective layer 22 may not be connected to a pixel voltage.

When the reflective layer 22 is multiplexed as a pixel electrode 11, the reflective layer 22 may be connected to a pixel voltage. The common electrode 12 may be located on one side of the liquid crystal cell 40 that is away from the first substrate 10, the reflective layer 22 may be connected to a first voltage signal, and the common electrode 12 may be connected to a common voltage signal. The common voltage signal may be provided by a driving IC that is disposed on the first substrate 10. In this case, white light passing through the liquid crystal cell 40, the phase-change material layer 24, and the resonant cavity 23, and reaching the reflective layer 22 may have one color filtered out due the cooperative action of the thickness of the resonant cavity 23 and the phase-change material layer 24. The remaining light may be reflected as mixed light. The reflected mixed light may pass through the resonant cavity 23 and the phase-change material layer 24 once again and enter the liquid crystal cell 40. Further, the reflected mixed light may be transmitted out through the liquid crystal cell 40. Meanwhile, the voltage difference between the first voltage of the reflective layer 22 and the common voltage of the common electrode 12 may form an electric field that drives the deflection of the liquid crystal molecules 41. The liquid crystal molecules 41 may be deflected to control the transmittance of the mixed light as it passes through the liquid crystal cell 40, such that adjustment of the gray scale may be realized.

Multiplexing the reflective layer 22 as the pixel electrode 11 may be able to simplify the fabrication process and also reduce the number of the film layers, and thus may be conducive to reducing the overall thickness of the display panel.

Further, referring to FIGS. 7-8, the second output terminal 62c of the second driving module 62 may be connected to the pixel electrode 11 via a through hole.

In one embodiment, the second driving module 62 may be connected to the pixel electrode 11 via a through hole. Because multiple film layers such as the heating element 21, the reflective layer 22, etc. may exist between the second driving module 62 and the pixel electrode 11, connecting the second output terminal 62c to the pixel electrode 11 via the through hole may simplify the fabrication process.

Figure 9:
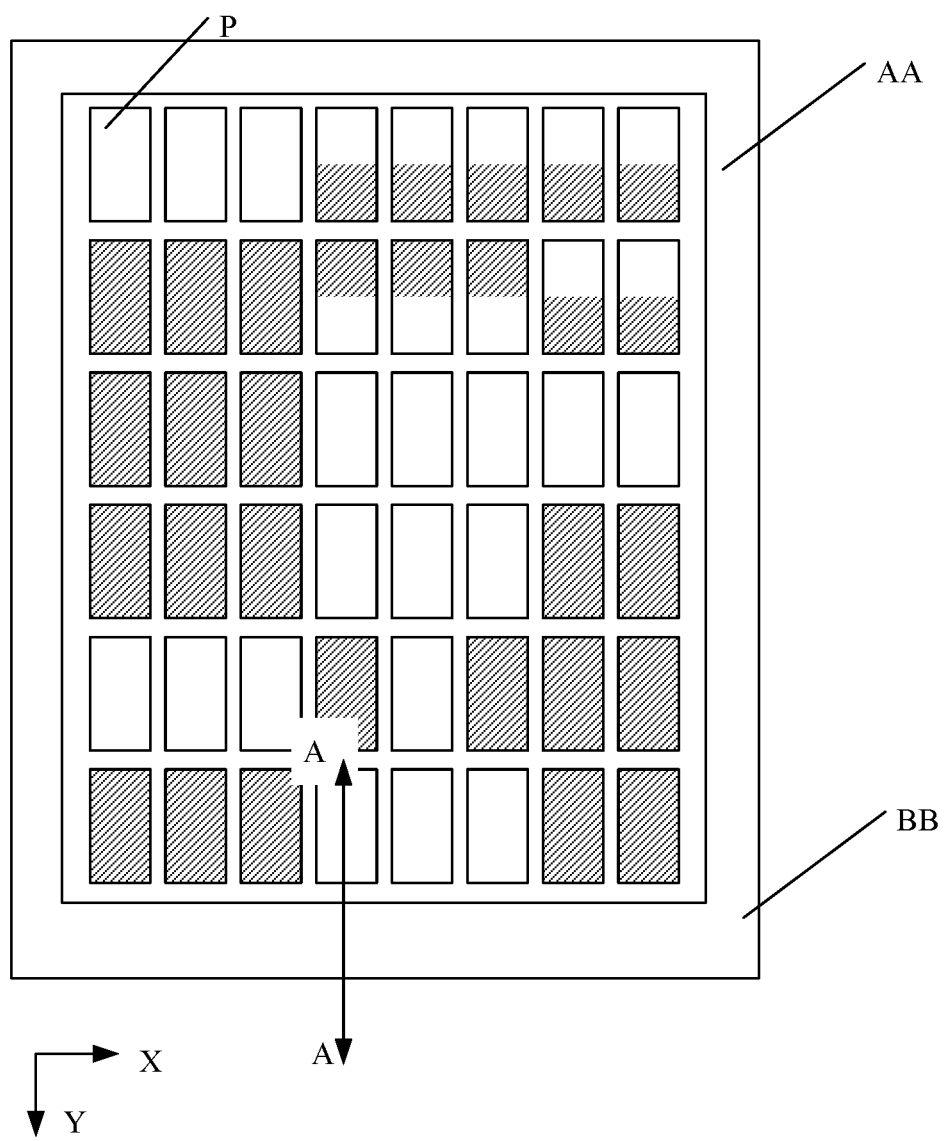
FIG. 9 illustrates a schematic plane-structure view of another exemplary display panel according to various embodiments of the present disclosure.
Figure 10:
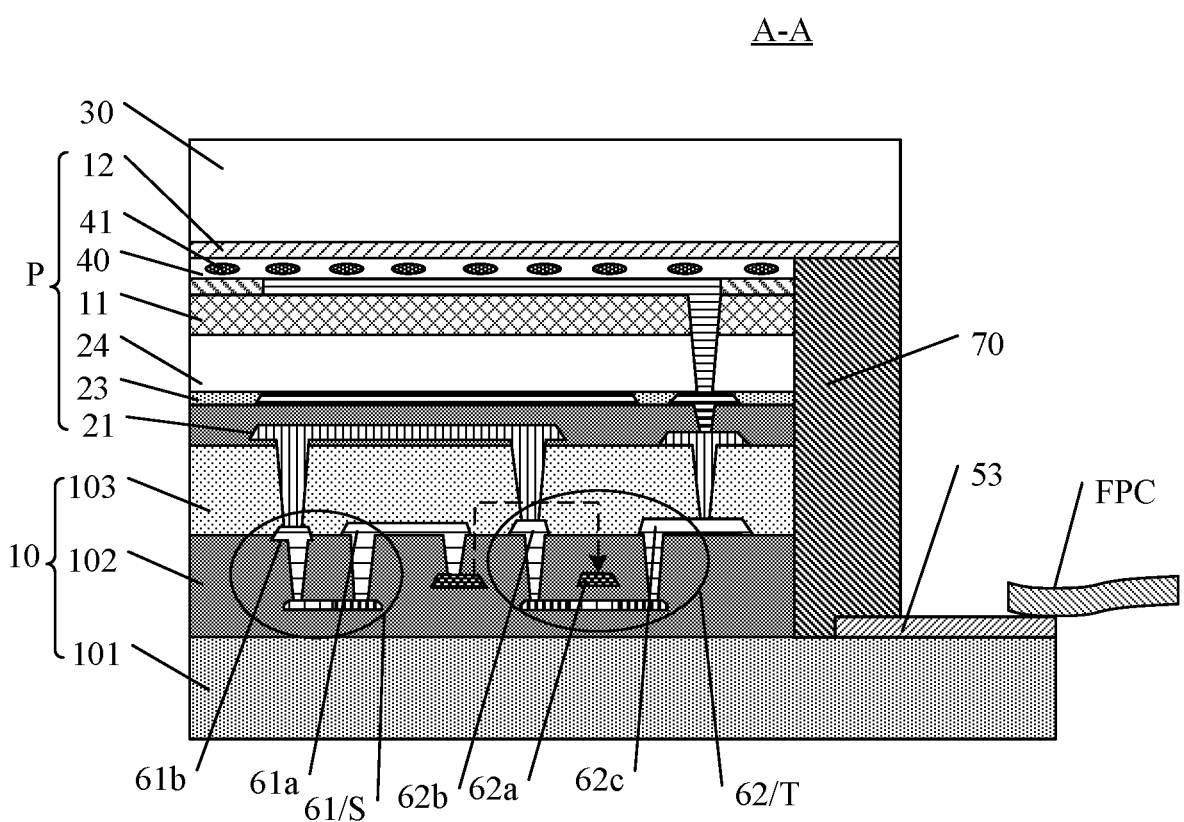
FIG. 10 illustrates a schematic cross-sectional view of the display panel shown in FIG. 9 along a B-B direction.

FIG. 9 illustrates a schematic plane-structure view of another exemplary display panel according to various embodiments of the present disclosure, and FIG. 10 illustrates a schematic cross-sectional view of the display panel shown in FIG. 9 along a B-B direction. Referring to FIGS. 9-10, the display panel 100 shown in FIG. 9 may include a display region AA, and a non-display region BB that surrounds the display region AA. The first substrate 10 in the non-display region BB may also include a stepped region on which a flexible printed circuit (FPC) is bound. The display panel 100 may also include a conductive frame sealant 70. As shown in FIG. 9, the conductive frame sealant 70 may be disposed in the non-display region BB, and the second substrate 30 and the first substrate 10 may be bonded by the conductive frame sealant 70 to form a sealed space to accommodate the heating element 21, the reflective layer 22, the resonant cavity 23, the phase-change material layer 24, and the liquid crystal cell 40, which are sequentially stacked therein. The first substrate 10 may include a common voltage signal line 53, and the common electrode 12 may be electrically connected to the common voltage signal line 53 through the conductive frame sealant 70.

It should be noted that in one embodiment, the common electrode 12 may be a full surface and may be connected only to the common voltage signal line 53 through the conductive frame sealant 70. The common voltage signal line may transmit a common voltage signal, and the common voltage signal may be provided by a driving IC disposed on the first substrate 10.

The liquid crystal cell 40 may be disposed between the common electrode 12 and the first substrate 10. Therefore, conduction wires cannot be disposed through the liquid crystal cell 40. By electrically connecting the common electrode 12 to the common voltage signal line 53 through the conductive frame sealant 70, not only the transmission of the common voltage signal can be implemented, but also the conductive frame sealant 70 can be fully utilized. As such, it is not necessary to additional dispose a wire to connect the common electrode 12 and the common voltage signal line 53, which may be conducive to realizing a narrow boarder frame, and thus may simplify the manufacturing process.

Figure 11:
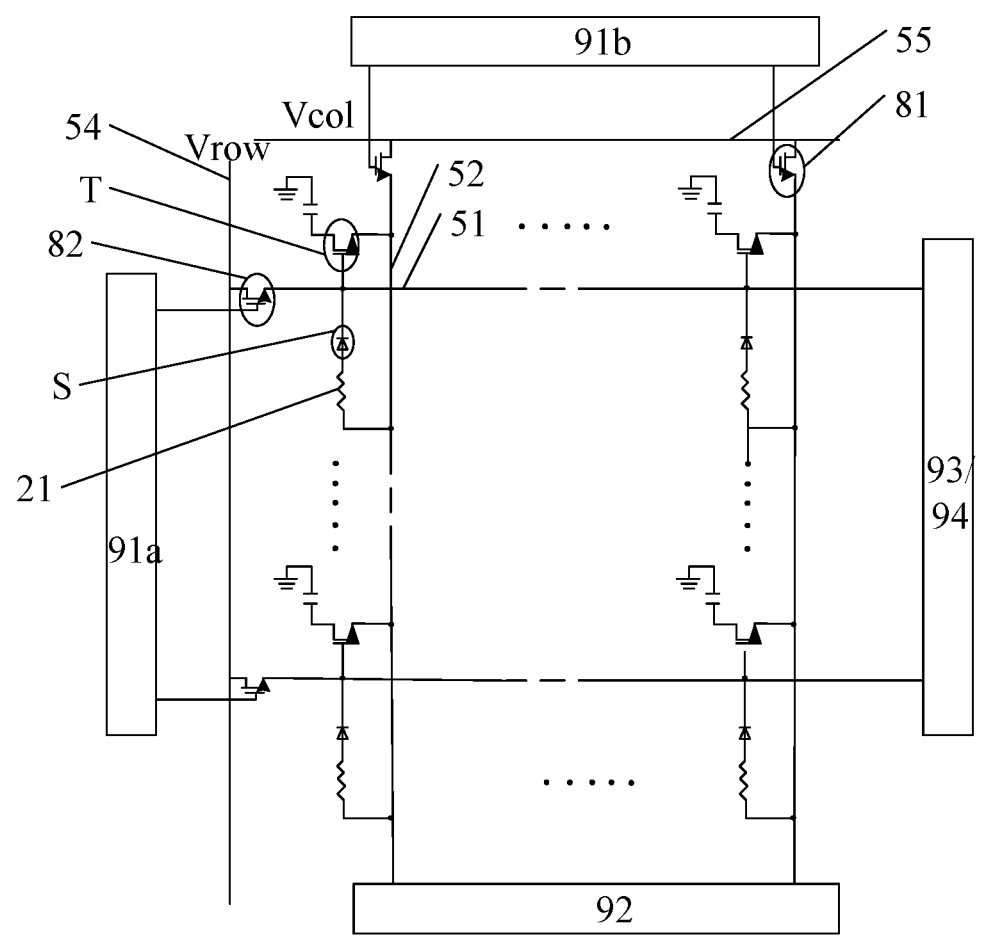
FIG. 11 illustrates a schematic circuit diagram of an exemplary display panel according to various embodiments of the present disclosure.

FIG. 11 illustrates a schematic circuit diagram of an exemplary display panel according to various embodiments of the present disclosure. Referring to FIG. 11, the display panel may also include a plurality of first power signal lines 54 and a plurality of second power signal lines 55. Corresponding to each second signal line 52, the display panel may also include a second switch transistor 81. That is, the display panel may include a plurality of second switch transistors 81. The plurality of second switch transistors 81 may be connected in a series and may be disposed between one end of the corresponding second signal line 52 and the second power signal line 55. In one embodiment, connecting the plurality of second switch transistors 81 in a series may refer to that the source electrode and the drain electrode of each second switch transistor 81 are connected to the second signal line 52 and the second power signal line 55, respectively. The second switch transistor 81 may be used to control whether the second signal line 52 transmits a voltage signal.

Referring to FIG. 11, corresponding to each first signal line 51, the display panel may also include a first switch transistor 82. That is, the display panel may include a plurality of first switch transistors 82. The plurality of first switch transistors 82 may be connected in a series and may be disposed between one end of the corresponding first signal line 51 and the first power signal line 54. In one embodiment, connecting the plurality of first switch transistors 82 in a series may refer to that the source electrode and the drain electrode of each first switch transistor 82 are connected to the first signal line 51 and the first power signal line 54, respectively. The first switch transistor 82 may be used to control whether the first signal line 51 transmits a voltage signal.

Further, referring to FIG. 11, the display panel may also include a first driving IC 91a, a first driving IC 91b, and a second driving IC 92. The first driving IC 91a may be electrically connected to the control terminal of each first switch transistor 82, and the first driving IC 91b may be electrically connected to the control terminal of each second switch transistor 81. The second driving IC 92 may be electrically connected to another end of each second signal line 52. The display panel may also include a gate driving IC 93 or a scan driving circuit 94, and the other end of each first signal line 51 may be connected to the gate driving IC 93 or the scan driving circuit 94.

The operation principle of the diode S driving the heating element to generate heat may be the following. The control terminal of the first switch transistor 82 may control whether the first switch transistor 82 is turned on. When the first switch transistor 82 is turned on, a voltage signal may be sent to the first signal line 51. The control terminal of the second switch transistor 81 may control whether the second switch transistor 81 is turned on. When the second switch transistor 81 is turned on, a voltage signal may be sent to the second signal line 52. The first driving IC 91a may be electrically connected to the control terminal of each first switch transistor 82, and the first driving IC 91b may be electrically connected to the control terminal of each second switch transistor 81. The first driving IC 91a may control the first switch transistor 82 to be turned on and thus the first power signal line 54 may be able to send a voltage signal Vrow to the first signal line 51; the first driving IC 91b may control the second switch transistor 81 to be turned on and thus the second power signal line 55 may be able to send a voltage signal Vcol to the second signal line 52. In one embodiment, Vrow and Vcol may be the voltage required during the operating period of the diode S.

The operation principle of the first transistor T driving the liquid crystal molecules to deflect may be the following. Because the diode S and the first transistor may share a same first signal line 51 and a same second signal line 52, corresponding to the voltage during the operating period of the first transistor T, a pixel voltage may be provided to the second signal line 52 through the second driving IC 92. In addition, the switch voltage of the gate electrode (the control terminal) of the first transistor T may be achieved through the control of the first driving IC 91a, and simply adjusting the magnitude of voltage Vrow may be able to turn on the first transistor T.

In one embodiment, the other end of each first signal line 51 may be connected to a gate driving IC 93 or a scan driving circuit 94 to implement row scanning of the plurality of pixel units.

Further, referring to FIGS. 5-6, in a pixel unit, the first driving module 61 and the second driving module 62 may be turned on in a time-sharing manner.

It should be understood that, on the one hand, driving the SRD may need a diode S for driving because the heating process of the heating element requires a large current. However, the current of the first transistor T may be insufficient to drive the heating element to efficiently generate heat. The first transistor T may be used to drive the liquid crystal cell 40, and the first transistor T may not be able to sustain the large current that drives the diode. When the diode S and the first transistor T are simultaneously turned on, the first transistor T may be damaged. Therefore, the diode S and the first transistor T may need to be turned on in a time-sharing manner. On the other hand, having the diode S and the first transistor T turned on in a time-sharing manner may be able to realize the sharing of the first signal line 51 and the second signal line 52 by the diode S and the first transistor T. Turning on the diode S and the first transistor T in a time-sharing manner may refer to that when the diode S is turned on, the first transistor T is in the turned-off state, and only when the diode S is turned off, the first transistor T may then be turned on. When the first transistor T is a P-type first transistor, the gate electrode (the control terminal 62a) of the first transistor may be connected to the P pole of the diode S, such that the second diode and the first transistor T can be turned on in a time-sharing manner.

Referring to FIGS. 5-6, the first driving module 61 may include a diode S, and the second driving module may include a first transistor T.

TABLE 1

Examples of the voltages of the first driving module and the second driving module being turned on in a time-sharing manner when the first transistor T is an N-type transistor.

| Turning on in a time-sharing manner | LCD turned on SRD turned off | LCD turned on | | |
|---|---|---|---|---|
| | | SRD high-voltage | SRD low-voltage | SRD holding |
| GATE | 10 V | −10 V | −10 V | −10 V |
| SOURCE | (−20 V, −10 V) | 5 V | 0 V | disconnected |
| VCOM | −15 V | −15 V | −15 V | −15 V |
| DIODE | Reverse bias | Positive bias Vds = 15 V | Positive bias Vds = 10 V | No current |
| NTFT | Vgs > Vth | Vgs < Vth | Vgs < Vth | Vgs < Vth |

In Table 1, GATE is a gate voltage transmitted by the first signal line 51, SOURCE is a source voltage transmitted by the second signal line 52, VCOM is a voltage of the common electrode, DIODE indicates whether the diode S is in the turned-on state, NTFT indicates whether the first transistor T is in the turned-on state, Vgs is the difference between the gate voltage and the source voltage, and Vth is a threshold voltage (about 1.5 V) of the first transistor T in the turned-on state. LCD turned on represents that the first transistor drives the liquid crystal molecules to deflect (i.e. to change the orientation), and LCD turned off represents that the first transistor is not turned on, and the liquid crystal molecules are not deflected. SRD turned off represents that the diode does not drive the heating element. SRD high-voltage indicates that the diode drives the heating element, and the current at this time causes the phase-change material layer to be in the first state. SRD low-voltage indicates that the diode drives the heating element, and the current at this time causes the phase-change material layer to be in the second state. SRD holding represents that no current is provided to the diode. It should be noted that, in one embodiment, the first state may be a crystalline state or may be an amorphous state, and the second state may be a crystalline state or an amorphous state. However, when the first state is a crystalline state, the second state should be an amorphous state, and when the first state is an amorphous state, the second state should be a crystalline state.

Further, referring to FIG. 5, in Table 1, with the LCD turned on and the SRD turned off, when the gate voltage is 10 V, the source voltage may be (−20 V, −10 V), and Vgs>Vth. At this time, the first transistor T may be turned on. Because the first driving module 61 and the second driving module 62 share the first signal line 51 and the second signal line 52, when the gate voltage is 10 V and the source voltage is (−20 V, −10 V), the voltage at the N pole of the diode S may be larger than the voltage at the P pole. Therefore, the diode S may be reversely biased and the diode S may not be in the turned-on state. As such, the first transistor T and the diode S may be turned on in a time-sharing manner.

Similarly, in Table 1, with the LCD turned off and the SRD at a high voltage, when the gate voltage is −10 V, the source voltage may be 5 V. At this time, Vgs (−15 V)<Vth, and thus the first transistor T may be turned off. When the gate voltage is −10 V and the source voltage is 5 V, the voltage at the P pole of the diode S may be larger than the voltage at the N pole. Therefore, the diode S may be positively biased, and the diode S may be turned on. As such, the first transistor T and the diode S may be turned on in a time-sharing manner. In Table 1, with the LCD turned off and the SRD at a low voltage, when the gate voltage is −10 V, the source voltage may be 0 V. At this time, Vgs (−10 V)<Vth, and thus the first transistor T may be turned off. When the gate voltage is −10 V and the source voltage is 5 V, the voltage at the P pole of the diode S may be larger than the voltage at the N pole. Therefore, the diode S may be positively biased, and the diode S may be turned on. As such, the first transistor T and the diode S may be turned on in a time-sharing manner. In Table 1, with LCD turned off and the SRD holding the voltage, when the gate voltage is −10 V, the source voltage may be disconnected, the first transistor T may be turned off, and the diode S may not have any current passing through.

Having a VCOM of −15 V may ensure that when the SRD and the LCD are refreshed, the source-drain current may not be lost from other pixels that do not perform SRD refresh or LCD refresh.

TABLE 2

Examples of the voltages of the first driving module and the second driving module being turned on in a time-sharing manner when the first transistor T is a P-type transistor.

| Turning on in a time-sharing manner | LCD turned on | LCD turned on | | |
|---|---|---|---|---|
| | SRD turned off | SRD high-voltage | SRD low-voltage | SRD holding |
| GATE | −10 V | 10 V | 10 V | 10 V |
| SOURCE | (20 V, 10 V) | −5 V | 0 V | disconnected |
| VCOM | 15 V | 15 V | 15 V | 15 V |
| DIODE | Reverse bias | Positive bias Vds = 15 V | Positive bias Vds = 10 V | No current |
| NTFT | Vgs < Vth | Vgs > Vth | Vgs > Vth | Vgs > Vth |

In Table 2, GATE is a gate voltage transmitted by the first signal line 51, SOURCE is a source voltage transmitted by the second signal line 52, VCOM is a voltage of the common electrode, DIODE indicates whether the diode S is in the turned-on state, NTFT indicates whether the first transistor T is in the turned-on state, Vgs is the difference between the gate voltage and the source voltage, and Vth is a threshold voltage (about −1.5 V) of the first transistor T in the turned-on state. LCD turned on represents that the first transistor drives the liquid crystal molecules to deflect (i.e. to change the orientation), and LCD turned off represents that the first transistor is not turned on, and the liquid crystal molecules are not deflected. SRD turned off represents that the diode does not drive the heating element. SRD high-voltage indicates that the diode drives the heating element, and the current at this time causes the phase-change material layer to be in the first state. SRD low-voltage indicates that the diode drives the heating element, and the current at this time causes the phase-change material layer to be in the second state. SRD holding represents that no current is provided to the diode. It should be noted that, in one embodiment, the first state may be a crystalline state or may be an amorphous state, and the second state may be a crystalline state or an amorphous state. However, when the first state is a crystalline state, the second state should be an amorphous state, and when the first state is an amorphous state, the second state should be a crystalline state.

Further referring to FIG. 6, in Table 2, with the LCD turned on and the SRD turned off, when the gate voltage is −10 V, the source voltage may be (20 V, 10 V), and Vgs (having a negative value)<Vth. At this time, the first transistor T may be turned on. Because the first driving module 61 and the second driving module 62 share the first signal line 51 and the second signal line 52, when the gate voltage is −10 V and the source voltage is (20 V, 10 V), the voltage at the N pole of the diode S may be larger than the voltage at the P pole. Therefore, the diode S may be reversely biased and the diode S may not be in the turned-on state. As such, the first transistor T and the diode S may be turned on in a time-sharing manner.

Similarly, in Table 2, with the LCD turned off and the SRD at a high voltage, when the gate voltage is 10 V, the source voltage may be −5 V. At this time, Vgs (15 V)>Vth, and thus the first transistor T may be turned off. When the gate voltage is 10 V and the source voltage is −5 V, the voltage at the P pole of the diode S may be larger than the voltage at the N pole. Therefore, the diode S may be positively biased, and the diode S may be turned on. As such, the first transistor T and the diode S may be turned on in a time-sharing manner. With the LCD turned off and the SRD at a low voltage, when the gate voltage is 10 V, the source voltage may be 0 V. At this time, Vgs (10 V)>Vth, and the first transistor T may be turned off. When the gate voltage is 10 V and the source voltage is 0 V, the voltage at the P pole of the diode S may be larger than the voltage at the N pole. Therefore, the diode S may be positively biased, and the diode S may be turned on. As such, the first transistor T and the diode S may be turned on in a time-sharing manner. With the LCD turned off and the SRD holding the voltage, when the gate voltage is 10 V, the source may be disconnected, and the first transistor T may be turned off, and the diode S may not have any current passing through.

Having a VCOM of 15 V may ensure that when the SRD and the LCD are refreshed, the source-drain current may not be lost from other pixels that do not perform SRD refresh or LCD refresh.

It should be noted that the data shown in Table 1 and Table 2 are merely examples of the voltages of the first driving module and the second driving module that are turned on in a time-sharing manner. Therefore, instead of representing actual values, the voltages may be set according to actual conditions.

Further, referring to FIG. 2, the phase-change material layer 24 may have a first state and a second state. When the phase-change material layer 24 is in the first state, the pixel unit P may display a first color, and when the phase-change material layer 24 is in the second state, the pixel unit P may display a second color.

It should be noted that in one embodiment, the first state may be a crystalline state or may be an amorphous state, and the second state may be a crystalline state or an amorphous state. However, when the first state is a crystalline state, the second state should be an amorphous state, and when the first state is an amorphous state, the second state should be a crystalline state.

The phase-change material may be able to switch between the crystalline state and the amorphous state. The first color state and the second color state of the crystalline state and the amorphous state may have different optical characteristics, and through the switching between the first color state and the second color state, a single pixel unit P displaying two colors may be implemented.

When the phase-change material layer 24 is in the crystalline state, white light passing through the liquid crystal cell 40, the phase-change material layer 24, and the resonant cavity 23 and reaching the reflective layer 22 may have one color filtered out. The remaining light may be reflected as mixed light. The reflected mixed light may pass through the resonant cavity 23 and the phase-change material layer 24 once again and enter the liquid crystal cell 40. Therefore, the color viewed by human eyes may be the color of the mixed light, and the pixel unit P may display a first color. When the phase-change material layer 24 is in the amorphous state, white light passing through the liquid crystal cell 40, the phase-change material layer 24, and the resonant cavity 23 and reaching the reflective layer 22 may have another color filtered out. The remaining light may be reflected as mixed light. The reflected mixed light may pass through the resonant cavity 23 and the phase-change material layer 24 once again and enter the liquid crystal cell 40. Therefore, the color viewed by human eyes may be the color of the mixed light, and the pixel unit P may display a second color.

For example, when the phase-change material layer 24 is in the crystalline state, white light passing through the liquid crystal cell 40, the phase-change material layer 24, and the resonant cavity 23 and reaching the reflective layer 22 may have the blue light filtered out. The remaining light (the green light and the red light) may be reflected as mixed light. The reflected mixed light may pass through the resonant cavity 23 and the phase-change material layer 24 once again and enter the liquid crystal cell 40. Therefore, the color viewed by human eyes may be the color of the mixed light of the green light and the red light. At this time, the pixel unit P may display a yellow color. When the phase-change material layer 24 is in the amorphous state, white light passing through the liquid crystal cell 40, the phase-change material layer 24, and the resonant cavity 23 and reaching the reflective layer 22 may have the green color filtered out. The remaining mixed light of the red light and the blue light may be reflected. The reflected mixed light may pass through the resonant cavity 23 and the phase-change material layer 24 once again and enter the liquid crystal cell 40. Therefore, the color viewed by human eyes may be the color of the mixed light of the red light and the blue light. At this time, the pixel unit P may display a purple color.

According to the present disclosure, the heating element 21 may be driven to generate heat. When the heating element 21 is driven to generate heat, the heat may be quickly transferred to the phase-change material layer 24 through the reflective layer 22 and the resonant cavity 23, such that the phase-change material layer 24 may be heated. Therefore, the phase-change material layer 24 may be controlled to switch from one state to another state. When the phase-change material layer 24 is in the first state, the pixel unit P may display the first color, and when the phase-change material layer 24 is in the second state, the pixel unit P may display the second color.

Figure 12:
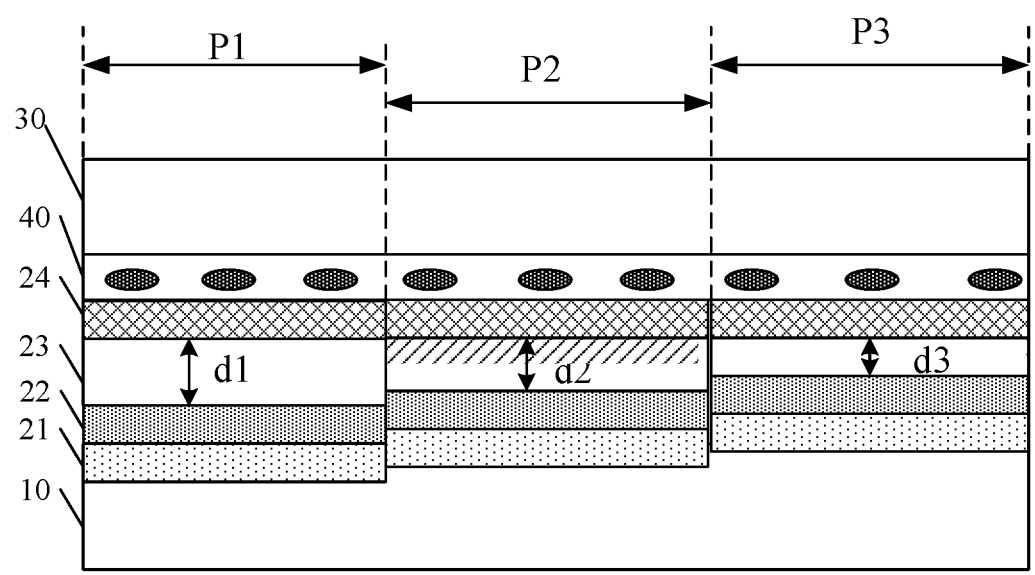
FIG. 12 illustrates a schematic view of another exemplary local cross section of the display panel shown in FIG. 1 along the A-A direction.

FIG. 12 illustrates a schematic view of another exemplary local cross section of the display panel shown in FIG. 1 along the A-A direction. Referring to FIG. 12, the pixel unit P may include a first-color pixel unit P1, a second-color pixel unit P2, and a third-color pixel unit P3. In the first-color pixel unit P1, the thickness of the resonant cavity may be d1 in the direction in which the heating element points to the phase-change material layer; in the second-color pixel unit P2, the thickness of the resonant cavity may be d2 in the direction in which the heating element points to the phase-change material layer; and in the third-color pixel unit P3, the thickness of the resonant cavity may be d3 in the direction in which the heating element points to the phase-change material layer, where $d1 \neq d2 \neq d3$.

Further, referring to FIG. 12, in the first-color pixel unit P1, the thickness of the resonant cavity 23 may be d1 in the direction in which the heating element 21 points to the phase-change material layer 24; in the second-color pixel unit P2, the thickness of the resonant cavity 23 may be d2 in the direction in which the heating element 21 points to the phase-change material layer 24; and in the third-color pixel unit P3, the thickness of the resonant cavity 23 may be d3 in the direction in which the heating element 21 points to the phase-change material layer 24, where $d1 \neq d2 \neq d3$. In the SRD composed of a reflective layer-resonant cavity-phase-change material layer, the phase-change material layer 24 may have two reversibly switchable states. By controlling the thickness of the resonant cavity 23, the wavelength of the light reflected from the cavity 23 may be controlled. Therefore, the resonant cavity 23 may be able to reflect light having a specific wavelength, and the pixel unit P may display light of a corresponding color.

In one embodiment, the resonant cavity 23 may be an optical resonant cavity, including two mirrors arranged in parallel with each other. The vertical distance between the two mirrors may be different. The light may be reflected back and forth between the two mirrors of the optical resonant cavity, and the wavelength of the light reflected out from the resonant cavity may be controlled by adjusting the thickness of the optical cavity, such that light with a certain wavelength may be reflected out from the resonant cavity. Therefore, each pixel unit P may display light of a corresponding color. When the plurality of pixel units P display simultaneously, the display panel may display different colors. According to various embodiments of the present disclosure, the thickness of the resonant cavity 23 in the first-color pixel unit P1, in the second-color pixel unit P2, and in the third-color pixel unit P3 may be designed differently to ensure that the first-color pixel unit P1, the second-color pixel unit P2, and the third-color pixel unit P3 may separately display different colors. Therefore, according to the various embodiments of the present disclosure, setting $d1 \neq d2 \neq d3$ may be able to increase the types of color that the pixel unit can display, that is, the color gamut may be increased. Therefore, the disclosed display panel may be conducive to improving the color fullness of the display.

Figure 13:
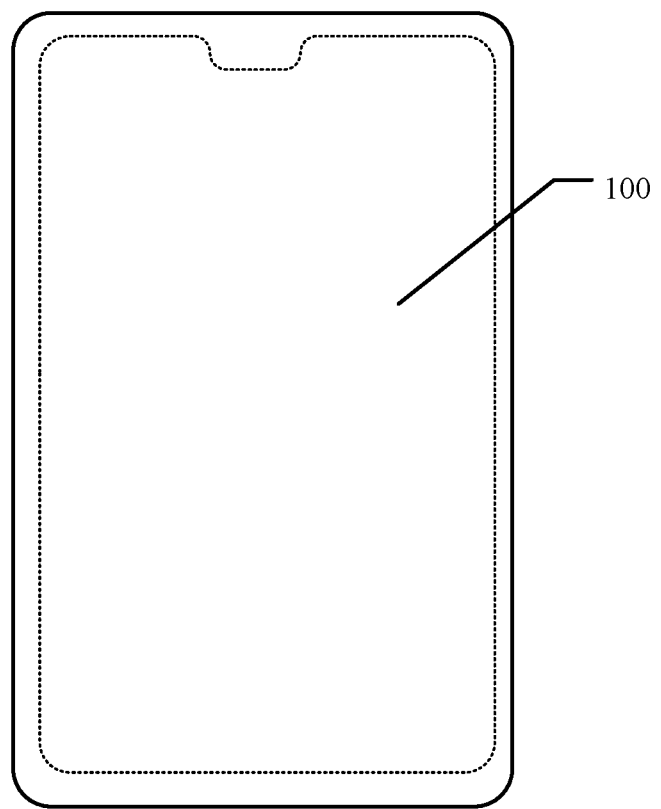
FIG. 13 illustrates a schematic view of an exemplary display device according to various embodiments of the present disclosure.

Further, based on the same concept, the present disclosure also provides a display device. FIG. 13 illustrates a schematic view of an exemplary display device according to various embodiments of the present disclosure. Referring to FIG. 13, the display device 200 may include a display panel 100 consistent with various embodiments of the present disclosure. In one embodiment, as shown in FIG. 13, a cell phone is provided as an example for the illustration of the disclosed display device 200. In other embodiments, the display device according to various embodiments of the present disclosure may be a personal computer (PC), a television (TV), an electronic paper, an in-vehicle display device, or any other appropriate device having a display function. The display device 200 provided by various embodiments of the present disclosure demonstrates the same beneficial effects as that demonstrated by the display panel 100 according to various embodiments of the present disclosure. For details, reference may be made to the detailed description of the display panel 100 provided in the embodiments described above.

Compared to existing display panels and display devices, the disclosed display panel and display device may be able to achieve at least the following beneficial effects.

The display panel according to the embodiments of the present disclosure includes a first substrate, a second substrate, and a plurality of pixel units disposed between the first substrate and the second substrate. Each pixel unit includes a heating element, a reflective layer, a resonant cavity, a phase-change material layer sequentially disposed on the first substrate. Each pixel unit further includes a liquid crystal cell disposed on a side of the first substrate that is adjacent to the first substrate, and the liquid crystal cell includes a plurality of liquid crystal molecules. According to the disclosed display panel, the heating element, the reflective layer, the resonant cavity, and the phase-change material layer that are sequentially disposed on the first substrate together forms a solid-state reflective device (SRD). Therefore, the liquid crystal cell is disposed on the basis of the SRD to adjust the gray scale of the display panel. As such, the display quality of the display panel is improved. In addition, according to the disclosed display panel, the SRD shares the first substrate with the liquid crystal cell, which is conducive to reducing the thickness of the display panel. Furthermore, the first driving module and the second driving module of the disclosed display panel share a first signal line and a second signal line, thereby the number of the wires in the display panel is reduced.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A display panel, comprising:
a first substrate and a second substrate;
a plurality of pixel units disposed between the first substrate and the second substrate, wherein each pixel unit of the plurality of pixel units includes a heating element, a reflective layer, a resonant cavity, and a phase-change material layer, that are sequentially disposed on the first substrate, and each pixel unit of the plurality of pixel units further includes a liquid crystal cell disposed on a side of the second substrate that is adjacent to the first substrate, wherein the liquid crystal cell is located on a side of the phase-change material layer away from the resonant cavity;
a plurality of first signal lines extending along a row direction and spaced from each other along a column direction, and a plurality of second signal lines extending along the column direction and spaced from each other along the row direction, wherein the plurality of first signal lines and the plurality of second signal lines are disposed on the first substrate, and intersect each other to define the plurality of pixel units; and
a driving circuit in correspondence to each pixel unit of the plurality of pixel units, wherein the driving circuit is located on the first substrate and includes a first driving module and a second driving module, the first driving module drives the heating element to control a state of the phase-change material layer, the second driving module controls deflection of a plurality of liquid crystal molecules in the liquid crystal cell, and the first driving module and the second driving module are connected to a same first signal line of the plurality of first signal lines and a same second signal line of the plurality of second signal lines.

2. A display panel, comprising:
a first substrate and a second substrate;
a plurality of pixel units disposed between the first substrate and the second substrate, wherein each pixel unit of the plurality of pixel units includes a heating element, a reflective layer, a resonant cavity, and a phase-change material layer, that are sequentially disposed on the first substrate, and each pixel unit of the plurality of pixel units further includes a liquid crystal cell disposed on a side of the second substrate that is adjacent to the first substrate;
a plurality of first signal lines extending along a row direction and spaced from each other along a column direction, and a plurality of second signal lines extending along the column direction and spaced from each other along the row direction, wherein the plurality of first signal lines and the plurality of second signal lines are disposed on the first substrate, and intersect each other to define the plurality of pixel units; and
a driving circuit in correspondence to each pixel unit of the plurality of pixel units, wherein the driving circuit is located on the first substrate and includes a first driving module and a second driving module, the first driving module drives the heating element to control a state of the phase-change material layer, the second driving module controls deflection of a plurality of liquid crystal molecules in the liquid crystal cell, and the first driving module and the second driving module are connected to a same first signal line of the plurality of first signal lines and a same second signal line of the plurality of second signal lines, wherein:
the first driving module includes a first terminal and a second terminal; and
the second driving module includes a control terminal, a second input terminal, and a second output terminal, wherein:
the control terminal of the second driving module is connected to the first terminal of the first driving module.

3. The display panel according to claim 2, wherein:
a terminal of the heating element is connected to the second signal line, and another terminal of the heating element is connected to the second terminal of the first driving module;
the first terminal of the first driving module is connected to the first signal line; and
the second input terminal of the second driving module is connected to the second signal line, and the control terminal of the second driving signal is connected to the first signal line.

4. The display panel according to claim 2, wherein:
the first driving module includes a diode, the diode including the first terminal and the second terminal, respectively;
the second driving module includes a first transistor, including the control terminal, the second input terminal, and the second output terminal, respectively.

5. The display panel according to claim 4, wherein:
the first transistor is an N-type first transistor, wherein the first terminal of the diode is an N pole of the diode.

6. The display panel according to claim 4, wherein:
the first transistor is a P-type first transistor, wherein the first terminal of the diode is a P pole of the diode.

7. The display panel according to claim 2, wherein:
each pixel unit of the plurality of pixel units includes a pixel electrode and a common electrode, wherein:
the common electrode is located on a side of the liquid crystal cell that is away from the first substrate,
the pixel electrode is located on a side of the liquid crystal cell that is adjacent to the first substrate,
the pixel electrode is connected to a first voltage signal, and
the common electrode is connected to a common voltage signal, wherein:
a voltage difference between a first voltage at the pixel electrode and a common voltage at the common electrode forms an electric field to drive the plurality of liquid crystal molecules to deflect.

8. The display panel according to claim 7, wherein:
the reflective layer is connected to the first voltage signal; and
the reflective layer is multiplexed as the pixel electrode.

9. The display panel according to claim 7, wherein:
the second output terminal of the second driving module is connected to the pixel electrode via a through hole.

10. The display panel according to claim 7, further including a conductive frame sealant, wherein:
the second substrate and the first substrate are bound together through the conductive frame sealant to form a sealed space to accommodate the heating element, the reflective layer, the resonant cavity, the phase-change material layer, and the liquid crystal cell;
the first substrate includes a common voltage signal line, wherein the common electrode is electrically connected to the common voltage signal line through the conductive frame sealant.

11. The display panel according to claim 3, further including:
a first power signal line and a second power signal line;
a plurality of second switch transistors with each corresponding to one second signal line of the plurality of second signal lines, wherein the plurality of second switch transistors are connected in a series and disposed between one end of a corresponding second signal line and the second power signal line; and
a plurality of first switch transistors with each corresponding to one first signal line of the plurality of first signal lines, wherein the plurality of first switch transistors are connected in a series and disposed between one end of a corresponding first signal line and the first power signal line.

12. The display panel according to claim 11, further including:
a first driving integrated circuit (IC); and
a second driving IC; wherein:
the first driving IC is electrically connected to the control terminal of each first switch transistor and the control terminal of each second switch transistor;
the second driving IC is electrically connected to another end of the second signal line; and
another end of the first signal line is connected to a gate driving IC or a scan driving circuit.

13. The display panel according to claim 1, wherein:
the first driving module and the second driving module in a same pixel unit are turned on in a time-sharing manner.

14. The display panel according to claim 1, wherein:
the plurality of liquid crystal molecules are guest-host liquid crystal molecules or polymer liquid crystal molecules.

15. The display panel according to claim 1, further including:
a quarter-wave plate disposed on a side of the phase-change material layer that is adjacent to the liquid crystal cell.

16. The display panel according to claim 1, wherein:
the phase-change material layer has a first state and a second state, wherein:
when the phase-change material layer is in the first state, the pixel unit displays a first color, and
when the phase-change material layer is in the second state, the pixel unit displays a second color.

17. The display panel according to claim 1, wherein:
the plurality of pixel units include a first-color pixel unit, a second-color pixel unit, and a third-color pixel unit, wherein:
in the first-color pixel unit, a thickness of the resonant cavity in a direction in which the heating element points to the phase-change material layer is d1;
in the second-color pixel unit, a thickness of the resonant cavity in a direction in which the heating element points to the phase-change material layer is d2; and
in the third-color pixel unit, a thickness of the resonant cavity in a direction in which the heating element points to the phase-change material layer is d3, wherein:
d1≠d2≠d3.

18. A display device, comprising:
a display panel, including:
a first substrate and a second substrate;
a plurality of pixel units disposed between the first substrate and the second substrate, wherein each pixel unit of the plurality of pixel units includes a heating element, a reflective layer, a resonant cavity, and a phase-change material layer, that are sequentially disposed on the first substrate, and each pixel unit of the plurality of pixel units further includes a liquid crystal cell disposed on a side of the second substrate that is adjacent to the first substrate, wherein the liquid crystal cell is located on a side of the phase-change material layer away from the resonant cavity;
a plurality of first signal lines extending along a row direction and spaced from each other along a column direction, and a plurality of second signal lines extending along the column direction and spaced from each other along the row direction, wherein the plurality of first signal lines and the plurality of second signal lines are disposed on the first substrate, and intersect each other to define the plurality of pixel units; and
a driving circuit in correspondence to each pixel unit of the plurality of pixel units, wherein the driving circuit is located on the first substrate and includes a first driving module and a second driving module, the first driving module drives the heating element to control a state of the phase-change material layer, the second driving module controls deflection of a plurality of liquid crystal molecules in the liquid crystal cell, and the first driving module and the second driving module are connected to a same first signal line of the plurality of first signal lines and a same second signal line of the plurality of second signal lines.

19. The display device according to claim 18, wherein:
the first driving module includes a first terminal and a second terminal; and
the second driving module includes a control terminal, a second input terminal, and a second output terminal, wherein:
the control terminal of the second driving module is connected to the first terminal of the first driving module.

20. The display device according to claim 18, wherein:
the plurality of pixel units include a first-color pixel unit, a second-color pixel unit, and a third-color pixel unit, wherein:
in the first-color pixel unit, a thickness of the resonant cavity in a direction in which the heating element points to the phase-change material layer is d1;
in the second-color pixel unit, a thickness of the resonant cavity in a direction in which the heating element points to the phase-change material layer is d2; and
in the third-color pixel unit, a thickness of the resonant cavity in a direction in which the heating element points to the phase-change material layer is d3, wherein:
d1≠d2≠d3.

* * * * *